United States Patent
Bar Yanai et al.

(10) Patent No.: US 12,218,849 B2
(45) Date of Patent: *Feb. 4, 2025

(54) HARDWARE-AGNOSTIC SPECIFICATION OF PACKET-PROCESSING PIPELINES

(71) Applicant: Mellanox Technologies, Ltd., Yokneam (IL)

(72) Inventors: Roni Bar Yanai, Even Yehuda (IL); Jiawei Wang, Shenzhen (CN); Yossef Efraim, Hong Kong Island (HK); Chen Rozenbaum, Beer Yaakov (IL)

(73) Assignee: Mellanox Technologies, Ltd, Yokneam (IL)

(*) Notice: Subject to any disclaimer, the term of this patent is extended or adjusted under 35 U.S.C. 154(b) by 0 days.

This patent is subject to a terminal disclaimer.

(21) Appl. No.: 18/589,466

(22) Filed: Feb. 28, 2024

(65) Prior Publication Data

US 2024/0250911 A1  Jul. 25, 2024

Related U.S. Application Data

(63) Continuation of application No. 17/955,583, filed on Sep. 29, 2022, now Pat. No. 11,968,126.

(60) Provisional application No. 63/274,553, filed on Nov. 2, 2021.

(51) Int. Cl.
*H04L 47/2483* (2022.01)
*H04L 45/748* (2022.01)

(52) U.S. Cl.
CPC ........ *H04L 47/2483* (2013.01); *H04L 45/748* (2013.01)

(58) Field of Classification Search
CPC ............... H04L 47/2483; H04L 45/748; H04L 43/0876; H04L 63/0428; H04L 63/101; H04L 69/22
See application file for complete search history.

(56) References Cited

U.S. PATENT DOCUMENTS

| 7,669,166 | B1 | 2/2010 | Brebner et al. |
| 9,405,866 | B1 | 8/2016 | Cho et al. |
| 9,983,857 | B2 | 5/2018 | Powers et al. |
| 10,521,283 | B2 | 12/2019 | Shuler et al. |
| 10,841,243 | B2 | 11/2020 | Levi et al. |
| 11,271,874 | B2 | 3/2022 | Levi et al. |
| 11,968,126 | B2 | 4/2024 | Bar Yanai et al. |
| 2013/0163475 | A1 | 6/2013 | Beliveau et al. |
| 2016/0191530 | A1* | 6/2016 | Jain .......... H04L 45/74 726/4 |
| 2019/0081899 | A1* | 3/2019 | Mundkur ........ H04L 47/34 |

(Continued)

OTHER PUBLICATIONS

Wikipedia, "PCI Express," pp. 1-26, last edited Aug. 29, 2022.

(Continued)

*Primary Examiner* — SM A Rahman
(74) *Attorney, Agent, or Firm* — Meitar Patents Ltd.; Daniel Kligler

(57) ABSTRACT

A method includes providing a library of hardware-agnostic packet-processing functions. A functional hardware-agnostic specification of a packet-processing pipeline is received from a user. The specification is defined in terms of one or more of the packet-processing functions drawn from the library. A hardware-specific design of the packet-processing pipeline, which is suited to given hardware, is derived from the specification.

18 Claims, 6 Drawing Sheets

(56) References Cited

U.S. PATENT DOCUMENTS

| | | |
|---|---|---|
| 2022/0078043 A1 | 3/2022 | Marcovitch et al. |
| 2022/0078107 A1 | 3/2022 | Subhaschandra et al. |
| 2023/0251980 A1 | 8/2023 | Syrivelis et al. |
| 2023/0315659 A1 | 10/2023 | Marcovitch et al. |
| 2023/0376450 A1 | 11/2023 | Ranadive et al. |

OTHER PUBLICATIONS

NVIDIA Developer, "CUDA Toolkit," NVIDIA Corporation, pp. 1-7, year 2022, as downloaded from https://developer.nvidia.com/cuda-toolkit.

Purandare, "DeepStream SDK," NVIDIA, pp. 1-19, Mar. 2018, as downloaded from https://on-demand.gputechconf.com/gtc/2018/presentation/s81047-introduction-to-deep-stream-sdk.pdf.

Infiniband Trade Association, "InfiniBandTM Architecture Specification", vol. 1, Release 1.3, pp. 1-1842, Mar. 3, 2015.

Wheeler, "DPU-Based Hardware Acceleration: A Software Perspective," White Paper, The Linley Group, Inc., pp. 1-8, Jun. 2021.

\* cited by examiner

HARDWARE-AGNOSTIC SPECIFICATION OF PACKET-PROCESSING PIPELINES

CROSS-REFERENCE TO RELATED APPLICATIONS

This application is a continuation of U.S. patent application Ser. No. 17/955,583, filed Sep. 29, 2022, which claims the benefit of U.S. Provisional Patent Application 63/274,553, filed Nov. 2, 2021. The disclosures of these related applications are incorporated herein by reference.

FIELD OF THE INVENTION

The present invention relates generally to packet processing, and particularly to hardware-agnostic specification of packet-processing pipelines.

BACKGROUND OF THE INVENTION

Network devices, such as switches, routers and network adapters in communication networks, typically process communication packets using packet processing pipelines.

U.S. Pat. No. 11,271,874 discloses a network adapter that includes a host interface configured to communicate with a host, a network interface configured to communicate with a communication network, and packet processing circuitry. The packet processing circuitry is configured to receive a packet from the host via the host interface, or from the communication network via the network interface, to receive an indication of a network time used for synchronizing network elements in the communication network, to match the packet to a rule, the rule including a condition and an action, and to perform the action in response to the packet meeting the condition, wherein one or more of (i) the conditions in the rule and (ii) the action in the rule, depend on the network time.

U.S. Pat. No. 10,841,243 discloses a network interface controller that is connected to a host and a packet communication network. The network interface controller includes electrical circuitry configured as a packet processing pipeline with a plurality of stages. It is determined in the network interface controller that at least a portion of the stages of the pipeline are acceleration-defined stages. Packets are processed in the pipeline by transmitting data to an accelerator from the acceleration-defined stages, performing respective acceleration tasks on the transmitted data in the accelerator, and returning processed data from the accelerator to receiving stages of the pipeline.

SUMMARY OF THE INVENTION

An embodiment of the present invention that is described herein provides a method including providing a library of hardware-agnostic packet-processing functions. A functional hardware-agnostic specification of a packet-processing pipeline, for use in a network device, is received from a user. The specification is defined in terms of one or more of the packet-processing functions drawn from the library. A hardware-specific design of the packet-processing pipeline, which is suited to given hardware, is derived from the specification.

In some embodiments, providing the library includes exposing to the user an Application Programming Interface (API) for defining the specification using the library. In various embodiments, the hardware-agnostic packet-processing functions perform one or more of Access Control List (ACL) functionality, Longest Prefix Matching (LPM), match table functionality, encryption, decryption, packet modification, packet mirroring, packet metering, packet counting, connection tracking, packet aging and packet forwarding.

In an embodiment, at least one of the hardware-agnostic packet-processing functions includes a user-configurable packet parsing operation, and receiving the specification from the user includes receiving a configuration of the packet parsing operation. In a disclosed embodiment, at least one of the hardware-agnostic packet-processing functions includes a user-configurable action, and receiving the specification from the user includes receiving a configuration of the action. In some embodiments, deriving the hardware-specific design of the packet-processing pipeline includes deriving a design of one of a switch, a router, a gateway, a network adapter, a firewall and a User-Plane Function (UPF).

There is additionally provided, in accordance with an embodiment that is described herein, an apparatus including a memory and a processor. The memory is to store a library of hardware-agnostic packet-processing functions. The processor is to provide the library to a user, to receive, from the user, a functional hardware-agnostic specification of a packet-processing pipeline for use in a network device, the specification defined in terms of one or more of the packet-processing functions drawn from the library, and to derive, from the specification, a hardware-specific design of the packet-processing pipeline that is suited to given hardware.

There is also provided, in accordance with an embodiment that is described herein, a computer software product. The product includes a tangible non-transitory computer-readable medium in which program instructions are stored, which instructions, when read by a processor, cause the processor to store a library of hardware-agnostic packet-processing functions, to provide the library to a user, to receive, from the user, a functional hardware-agnostic specification of a packet-processing pipeline for use in a network device, the specification defined in terms of one or more of the packet-processing functions drawn from the library, and to derive, from the specification, a hardware-specific design of the packet-processing pipeline that is suited to given hardware.

The present invention will be more fully understood from the following detailed description of embodiments thereof, taken together with the drawings in which:

DETAILED DESCRIPTION OF EMBODIMENTS

Overview

Figure 1:
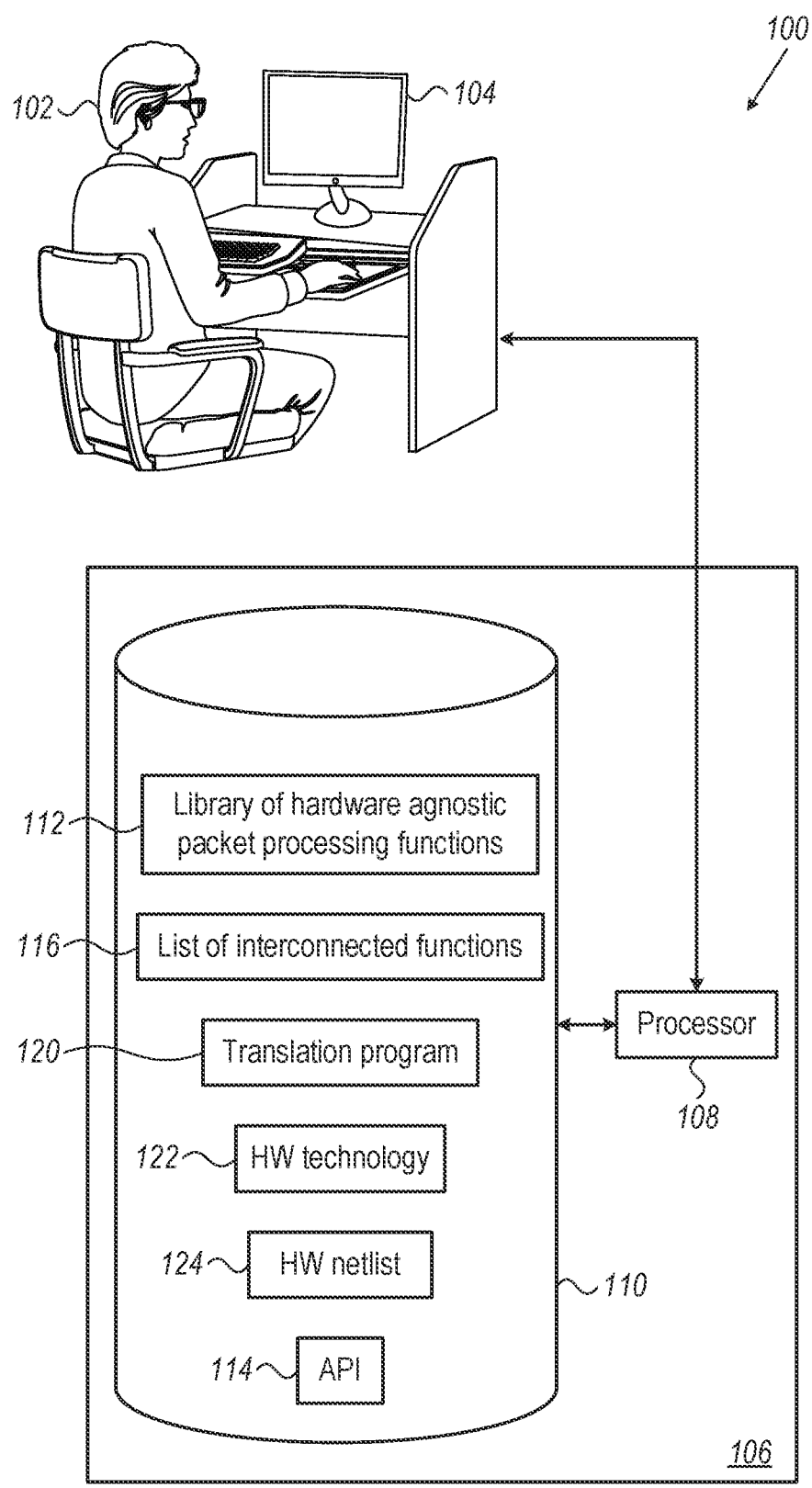
FIG. 1 is a block diagram that schematically illustrates a system for the design of a pipeline-based packet processing system, in accordance with an embodiment of the present invention.

Network devices, such as network switches, routers, network adapters and others, communicate packets over a communication network (e.g., Ethernet or InfiniBand™). A Network device typically receives packets from the network through ingress ports and may forward some or all the packets through egress ports to the network, according to forwarding/routing rules. Alternatively, some packets may be forwarded to a Virtual Machine (VM), container or other entity running on the same host.

In practice, considerable similarity can be found between the basic packet-processing functions that make-up different types of pipelines in different network devices.

Embodiments of the present invention that are described herein provide improved methods and systems for specifying packet-processing pipelines. The disclosed techniques aim to decouple the initial specification of a packet-processing pipeline from the target hardware on which the pipeline will eventually run. In this manner, a user can specify the packet-processing pipeline from an entirely functional perspective. At a later stage, the user's specification can be mapped onto the desired target hardware.

In some embodiments, the user is provided with a library of hardware-agnostic packet-processing functions. Such hardware-agnostic packet-processing functions may comprise, for example, an Access Control List (ACL) function, a Longest Prefix Match (LPM) function, a match table function, an encryption/decryption function, a packet modification function, a mirroring function, a metering function, an aging function, a Deep Packet Inspection (DPI) function, a packet forwarding function, and the like. In some embodiments, two or more of the above functions can be merged into a single function. For example, packet modification, mirroring and metering can be combined in a single packet-processing function of the library.

The library may be exposed to the user, for example, using a suitable Application Programming Interface (API).

The user uses the packet-processing functions in the library as building blocks and connects and configures them to specify a packet-processing pipelines. Many types of pipelines can be specified using such building blocks, in an entirely hardware-agnostic manner. Examples of packet-processing pipelines comprise a switch, a router, a gateway, a network adapter, a firewall and a User-Plane Function (UPF), to name only a few.

Once the hardware-agnostic specification has been defined, a processor may use it to derive a hardware-specific design of the packet-processing pipeline that is suited to a given hardware technology. This process may be fully automated or assisted by a user.

The disclosed techniques provide a highly effective tool for enabling users to specify the functionality of a packet-processing pipeline, while hiding the underlying complexity and constraints of the target hardware. This sort of decoupling simplifies the specification task of the user. Moreover, the same hardware-agnostic specification can be mapped to different hardware technologies with minimal user involvement.

System Description

Network devices, such as network switches, routers and adapters, receive packets from a communication network (e.g., Ethernet or InfiniBand™) and process the packets. In modern high-speed networks, packet processing is typically done in one or more hardware and software pipelines, which process multiple packets concurrently.

The design of such pipelines, including the interfaces between the pipes, may be complex and tightly coupled to a chosen hardware technology.

To simplify the design of the pipelines, a library of hardware-agnostic processing functions and underlying automation tools is provided. The library, automation tools and steering engine are referred to as Data Center on a Chip Architecture flow (DOCA flow).

FIG. 1 is a block diagram that schematically illustrates a system 100 for the design of a pipeline-based packet processing system, in accordance with an embodiment of the present invention. A user 102 (for example, an electronics engineer), operating a workstation 104, communicates with a computer 106 to enter his or her packet processing design. In embodiments, workstation 104 may comprise a screen, a keyboard, and a mouse, communicating with computer 106, e.g., through Universal Serial Bus (USB) interfaces. In other embodiments computer 106 may be embedded in workstation 104. In some embodiments computer 106 may be remote, interfacing with workstation 104 through a communication network, e.g., Ethernet. In yet other embodiments computer 106 may be a cloud-computing resource.

Computer 106 comprises a processor 108 and a memory 110. The memory comprises a library of hardware-agnostic packet processing functions 112 (referred to as "the library" hereinbelow). In embodiments, the library may include functions such as Access Control List (ACL), a Longest Prefix Match (LPM) function and many others (a partial list of functions will be detailed below).

To design a packet processing hardware/software, user 102 runs an Application Programming Interface (API) 114 (for example, a Graphic-User Interface (GUI), or, for another example, an API code). The user selects elements from the library, configures the elements (for example, using scripts or using pop-up menus) and interconnects the elements, to form a list of interconnected functions 116.

The list of interconnected functions is hardware-agnostic and can be reused for various target hardware technologies, including (but not limited to) ASIC process technology, FPGA families, etc. To generate a hardware-specific implementation, user 102 specifies the hardware technology in a hardware technology file 122, according to a predefined format (e.g., Synopsys techfile (.tf), or Cadence LEF file (.techlef)). For example, in some embodiments, the technology file may include a list of primitive gates.

Memory 110 further comprises a translation program 120 (sometimes referred to as DOCA flow Compiler), which is configured to translate the list of interconnected functions to a hardware netlist, according to the hardware technology file 122. The translation generates target netlist files 124, which can then be used to generate the design hardware and software (for the purpose of the current disclosure, the term "netlist" includes a plurality of abstraction levels, including ASIC layout Graphic Design System 2 (GDSII), gate-level Hardware Definition Language (HDL), behavioral HDL, structural HDL, FPGA programming bitstreams and others, including combinations of more than one level). User 102 may rerun translation program 120 when new hardware becomes available, to generate an updated version of the same design.

Thus, according to the example embodiment illustrated in FIG. 1 and described hereinabove, a user can design complex packet processing hardware and hardware/software combinations obliviously to the implementation technology, saving design time and minimizing design errors.

The configuration of block diagram 100 illustrated in FIG. 1 and described hereinabove is an example that is cited by way of example. Other embodiments may be used in alternative embodiments. For example, in some embodiments the user may provide a script that defines configuration and interconnect of the selected processing functions of library 112; in an embodiment, an intermediate abstraction level may be used, in which a plurality of interconnected library functions forms a flow pipe, which may be coupled to other flow-pipes, to library functions, and to ingress or egress ports.

Figure 2:
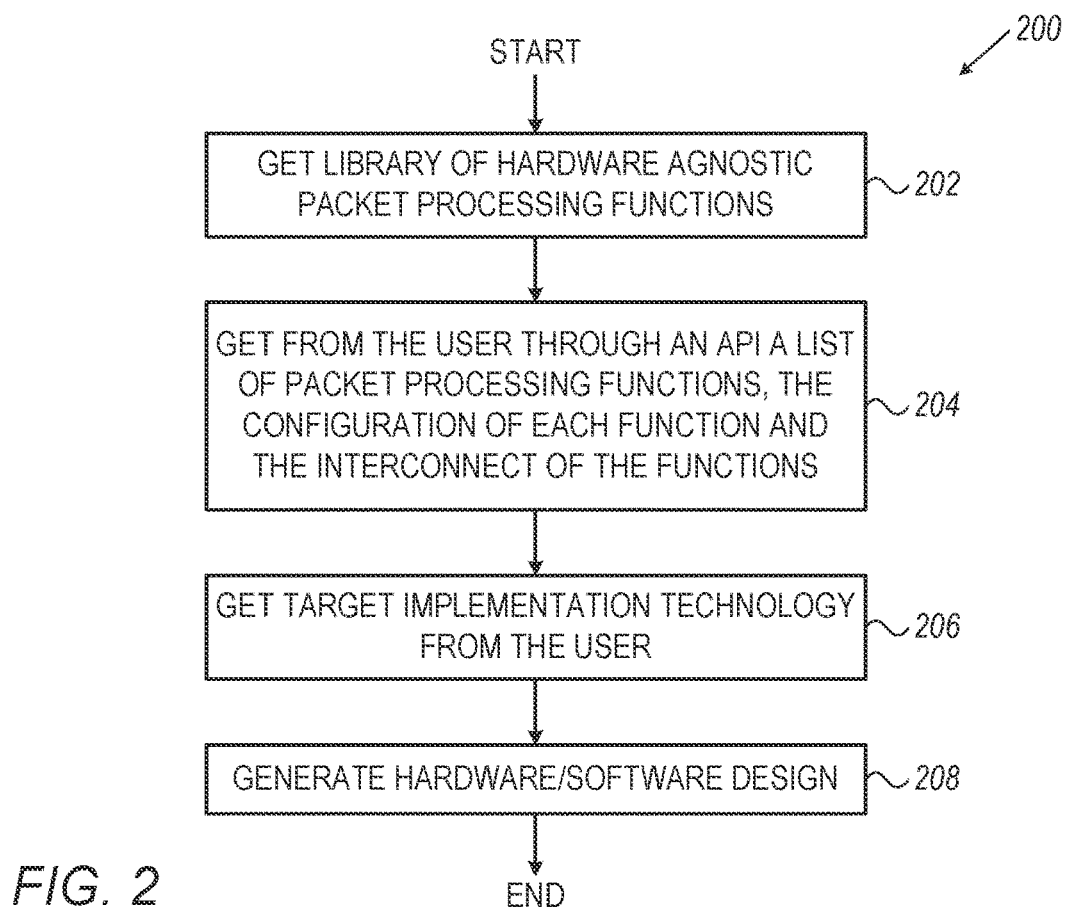
FIG. 2 is a flowchart that schematically illustrates a method for designing a pipeline-based packet processing system, in accordance with an embodiment of the present invention.

FIG. 2 is a flowchart 200 that schematically illustrates a method for designing a pipeline-based packet processing system, in accordance with an embodiment of the present invention. The method is executed by computer 106, operated by user 102 (FIG. 1).

The method starts at a Get Library operation 106, wherein the computer is provided with a library of hardware-agnostic packet processing functions 112 (FIG. 1). Next, at a Get List of Functions operation 204, the computer receives from the user, through an API, the list of selected library functions, the configurations of the functions and the connections between the functions.

At this point, the hardware-agnostic part of the design is complete. The computer can now generate implementation files for selected implementation technologies. At a Get Target Implementation Technology operation 206, the processor receives a technology file for the target hardware technology, and, in a Generate Hardware/Software Design operation 208, builds a design file (e.g., netlist and C-code).

The flowchart illustrated in FIG. 2 and described hereinabove is cited by way of example. Other flowcharts may be used in alternative embodiments. For example, in an embodiment, operation 204 comprises defining hardware-agnostic flow pipes, each comprising a set of library functions; in another embodiment, following operation 204, the computer stores the interconnected and configured functions in an intermediate format; and, in yet another embodiment, operation 208 may comprise an incremental front-end part, which is run separately for each function or group of functions, and a backend part, which compiles the complete network.

Packet Processing Functions

In embodiments, elements of the hardware-agnostic packet processing library include some or all the following:

1. An Access Control List (ACL) function—a processing function that decides on an action to be applied to a packet (typically responsively to the packet header).
2. A Longest Prefix Match (LPM) function, which selects a best matching entry of a string from a table.
3. A match table function, which generates a table of compare values.
4. An encryption function (e.g., AES256).
5. A decryption function.
6. A packet modification function, which modifies a packet according to preset rules, and may include packet encryption/decryption, addition/removal of tunnels (e.g., encapsulation/decapsulation) and other modifications.
7. A packet mirroring function, which generates a mirror packet of a given packet.
8. A packet metering function, which measures a preset statistics of a given packet.
9. A packet counting function, which counts packet that meet a preset criterion.
10. A packet aging function, which sends an age measure of a given packet.
11. A Deep Packet Inspection (DPI) function, which inspects packets using DPI algorithms.
12. A packet forwarding function, to forward packets to a next packet processing function.
13. A connection tracking function.

Other functions may be used in alternative embodiments, in addition or in lieu of the list above.

Groups of interconnected packet processing functions form one or more packet processing flows (sometimes referred to as "pipes" below). In embodiments, packet processing flows may comprise a plurality of packet processing sub-flows, which handle a groups of packet processing functions.

Figure 3:
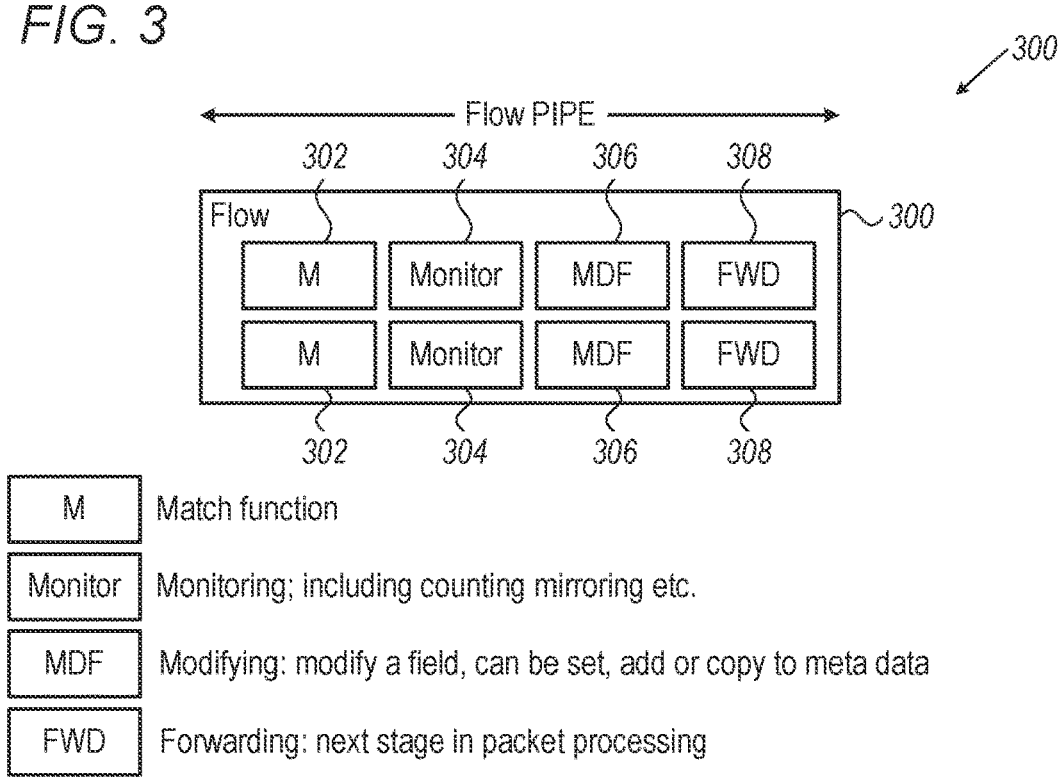
FIG. 3 is a block diagram that schematically illustrates a Data Center on a Chip Architecture (DOCA) flow pipe, in accordance with an embodiment of the present invention.

FIG. 3 is a block diagram that schematically illustrates a Data Center on a Chip Architecture (DOCA) flow pipe 300, in accordance with an embodiment of the present invention. The flow pipe comprises two parallel sub-flows (e.g., for faster operation); each sub-flow comprising a Match function 302, a Monitor function 304 (which may include packet metering), a Packer-Modify function, which modifies a packet field by setting, adding or copying metadata; and a Forwarding function 308, which forwards the output to a next packet processing flow, to a port, or to the software. In embodiments, Match function 302 are programmable, and may be enhanced by adding more matching criteria. In some embodiments, Monitor function 304 includes counting, bandwidth limiting, sampling (e.g., forwarding samples to software) and mirroring predefined packets.

The user may select functions 302, 304, 306 and 308 from the hardware-agnostic library, set parameters to the functions and define the interconnection of the functions in the pipeline flow.

The configuration of flow pipe 300 illustrated in FIG. 3 and described hereinabove is cited by way of example. Other configurations may be used in alternative embodiments. For example, in an embodiment, flow pipe 300 comprises more than two parallel sub flows; in embodiments, some or all the sub-flows are identical while others are not.

Figure 4:
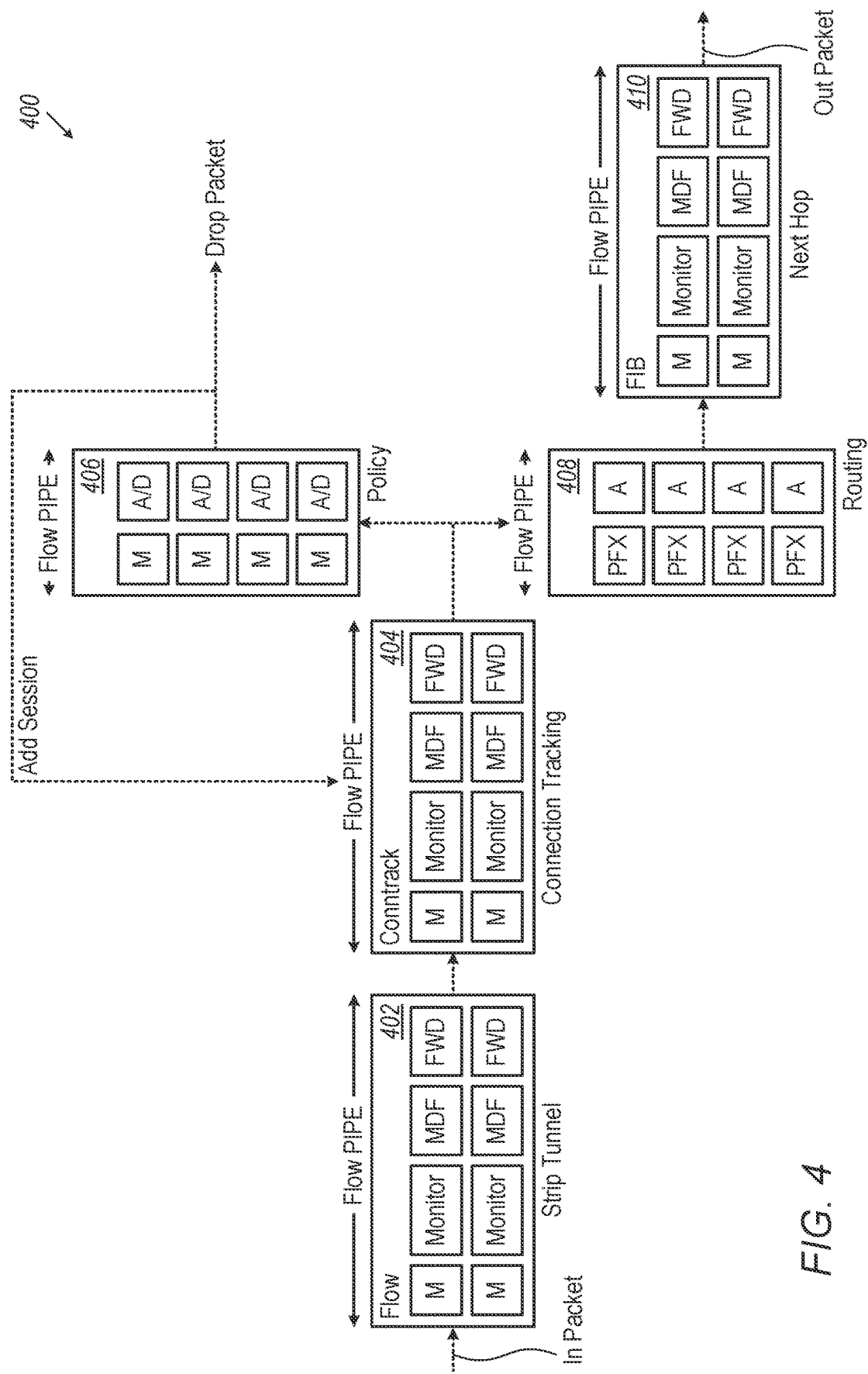
FIG. 4 is a block diagram that schematically illustrates a DOCA-flow generated communication switch, in accordance with an embodiment of the present invention.

FIG. 4 is a block diagram that schematically illustrates a DOCA-flow generated communication switch 400, in accordance with an embodiment of the present invention.

The design includes five flow-pipes, each comprising interconnected and parameterized hardware-agnostic functions, which the user selects from library 112 (FIG. 1).

A Strip-Tunnel flow-pipe 402 receives ingress packets and decapsulates the packets to recover and map internally capsulated packets, which the Strip-Tunnel then send to a Connection Tracking flow-pipe 404. Connection-Tracking flow-pipe 404 is configured to decide whether to accept the packet, or to send the packet to a Policy flow-pipe 406. The internal tables of Connection Tracking flow-pipe 404 typically take the decision by comparing packet header fields to built-in tables.

Policy flow-pipe 406 uses a predefined policy to elaborate the packet header and determine whether the packet should be allowed or denied. If the Policy flow-pipe decides that the packet is to be denied, the packet is dropped.

In embodiments, the policy-based elaboration is considerably slower than the processing done by Connection-Tracking flow-pipe 404; to enhance speed, the decision that the Policy flow-pipe takes vis-à-vis the packet header is then stored in the internal tables of Connection-Tracking flow-pipe 404, so that future occurrences of the same packet header (or a packet header having the same predefined set of characteristics) will be handled faster, without going to the Policy flow-pipe.

Connection Tracking flow-pipe 404 sends accepted packets to a Routing flow-pipe 408, which determines the destination of the packet, and sends the packet, with a destination indication, to a Forwarding Information Base (FIB) flow-pipe 410, which then forwards the packet to the destination (e.g., an egress port).

Thus, according to the example embodiment illustrated in FIG. 4 and described hereinabove, the user may design, using hardware-agnostic functions, a complete switch, obliviously to the implementation technology.

The configuration of communication switch 400 is cited by way of example, for the sole purpose of demonstrating the capabilities of a hardware-agnostic communication switch design according to embodiments. Other configurations may be used in alternative embodiments. For example, in an embodiment, Policy flow-pipe 406 may send accepted packets directly to routing flow pipe 408; in another embodiment, Connection Tracking 404 may store identifiers for packets to be denied, and drop such packets directly (rather than sending the packets to Policy flow-pipe 406).

Application Programming Interface (API)

In embodiments, the user employs an API to generate a hardware-agnostic representation of flow-pipes in packet processing systems. Using the API, the user can select, configure, and interconnect hardware-agnostic functions from function library 112 (FIG. 1). The API stores the interconnected assembly of functions in an internal database. In some embodiments, the user may further compile the API database, to produce a hardware-agnostic low-level (e.g., binary) representation of the flow-pipe.

To generate hardware-specific implementations, a flow-pipe backend program first converts the low-level representation to a suitable representation format, which may be used by an implementation engine to generate a circuit description (e.g., netlist or HDL) that is compatible with the target hardware technology.

Figure 5:
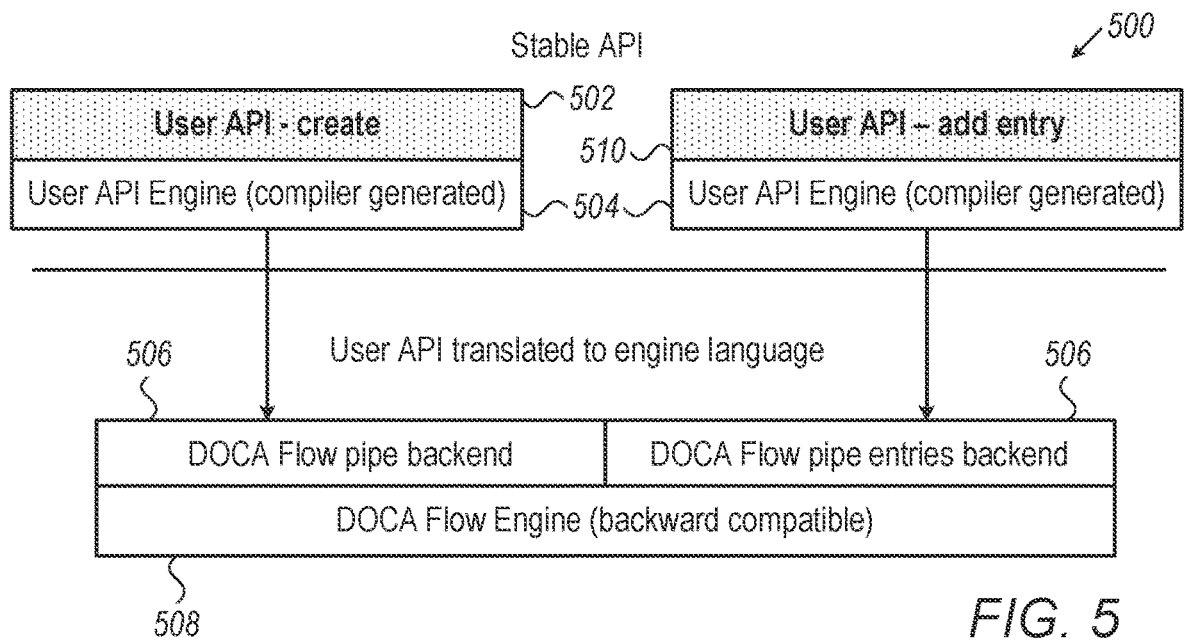
FIG. 5 is a block diagram that schematically illustrates the configuration of a translation software that converts hardware-agnostic API data base to a hardware-dependent circuit description, in accordance with an embodiment of the present invention.

FIG. 5 is a block diagram that schematically illustrates the configuration of a translation software 500 that converts hardware-agnostic flow pipes (to a hardware-dependent circuit description, in accordance with an embodiment of the present invention. The flow pipes are represented by suitable API databases. The software includes an API instance 502, which describes a flow-pipe. A user API compiler 504 compiles the API database to a low-level hardware-agnostic representation of the flow-pipe.

To convert the low-level code into a hardware description that is compatible with a target hardware technology, a flow-pipe backend program 506 converts the low-level code to an intermediate representation, which is input to a DOCA flow engine 508, to generate the hardware-dependent circuit database.

In embodiments, the process described hereinabove is incremental; to add another flow-pipe by an API 510, the flow pipe is compiled by user API engine 504 and then processed by the flow-pipe backend 506, which converts the added function to an additional input to DOCA flow engine 508.

It is important to note that the original flow pipe may have been a-priori created by User API 502, compiled to a low-level representation by API engine 504 and converted to a DOCA flow engine input by DOCA flow backend 506. To add a new function, or a flow pipe, the user repeats the step described above for the added function or flow pipe only; only the final stage—DOCA flow backend engine—must be run on the complete circuit.

Thus, the disclosed technique allows efficient addition of hardware-agnostic functions to a hardware description.

The configuration of translation software 500 illustrated in FIG. 5 and described hereinabove is cited by way of example. Other configurations may be used in alternative embodiments. For example, in some embodiments, there is no API compiler (504); instead, flow-pipe backend program 506 translates the flow-pipe descriptions generated by APIs 502 and 510 directly to a format that is compatible with DOCA flow engine 508.

Figure 6:
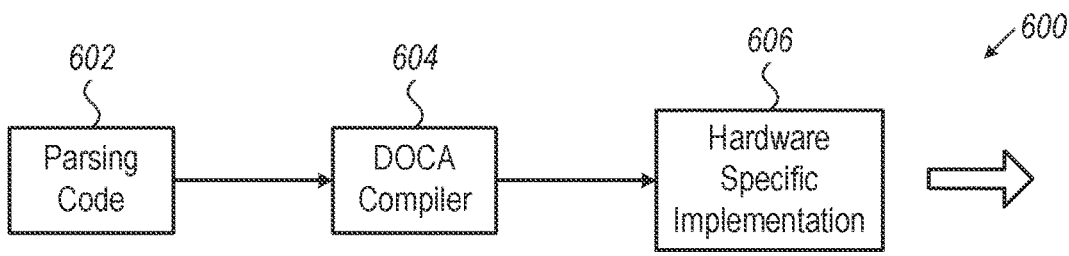
FIG. 6 is a block diagram that schematically illustrates the generation of a parser circuit from a hardware-agnostic description, in accordance with an embodiment of the present invention.

FIG. 6 is a block diagram that schematically illustrates the generation of a parser circuit from a hardware-agnostic description, in accordance with an embodiment of the present invention. The user writes a hardware-agnostic parser code 602, using match and action primitives that may be compatible to P4. In some embodiments, a special language is used for the description of the parser. A DOCA flow compiler 604 then generates a hardware-specific implementation 606, which may comprise a C structure and hardware netlists, that implements the required matches and actions defined in parsing code 602 in the target hardware technology and software code.

Targeting Functions for Software Implementation

In some embodiments, the DOCA flow compiler may generate a mixed target circuitry, comprising hardware implementation of some flow-pipes and software implementation of other flow pipes (or functions within flow pipes). In an embodiment, software implementation can be done by a fast embedded processor or processors (e.g., a bank of high-performance Embedded Reduced Instruction Set (eRCV) processors), which is tightly coupled to hardware flow-pipes, for minimal invocation and parameter-passing overhead.

In another embodiment DOCA flow may target a Data-Path-Accelerator (DPA), typically comprising a general-purpose processor (or processors). The DPA may be invoked by hardware-generated exceptions.

In an embodiment, to improve speed, the processor (the DPA and/or the eRVC) sends the software execution results back to a hardware flow-pipe, so that future occurrences of the same packet-type will be handled by hardware only.

Figure 7:
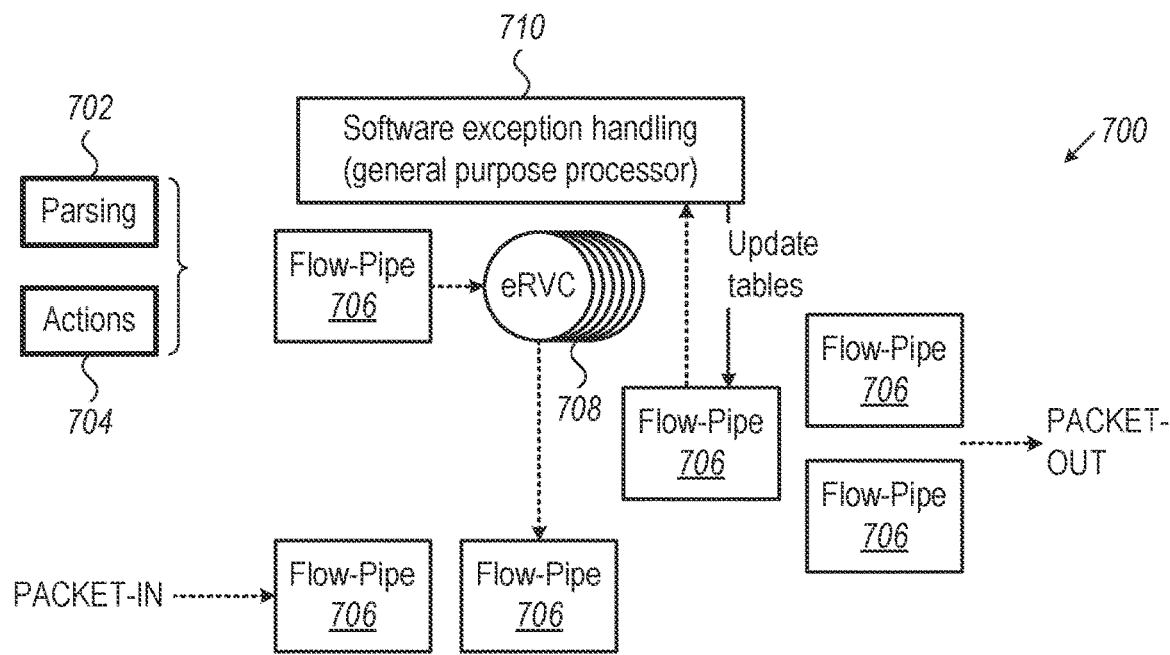
FIG. 7 is a block diagram that schematically illustrates a DOCA-flow generated mixed hardware-software circuitry, in accordance with an embodiment of the present invention.

FIG. 7 is a block diagram that schematically illustrates a DOCA-flow generated mixed hardware-software circuitry 700, in accordance with an embodiment of the present invention. The circuitry is configured to execute a Parsing 702, and associated Actions 704. The implementation comprises interconnected flow-pipes 706, an eRVC 708, which is tightly coupled to the flow pipes, and a software exception handling 710, which is executed by one or more general purpose processors. The general-purpose processor is configured to update tables within the flow-pipe, so that further occurrences of the same packet type will be handled by the flow-pipe, with no software intervention.

Figure 8:
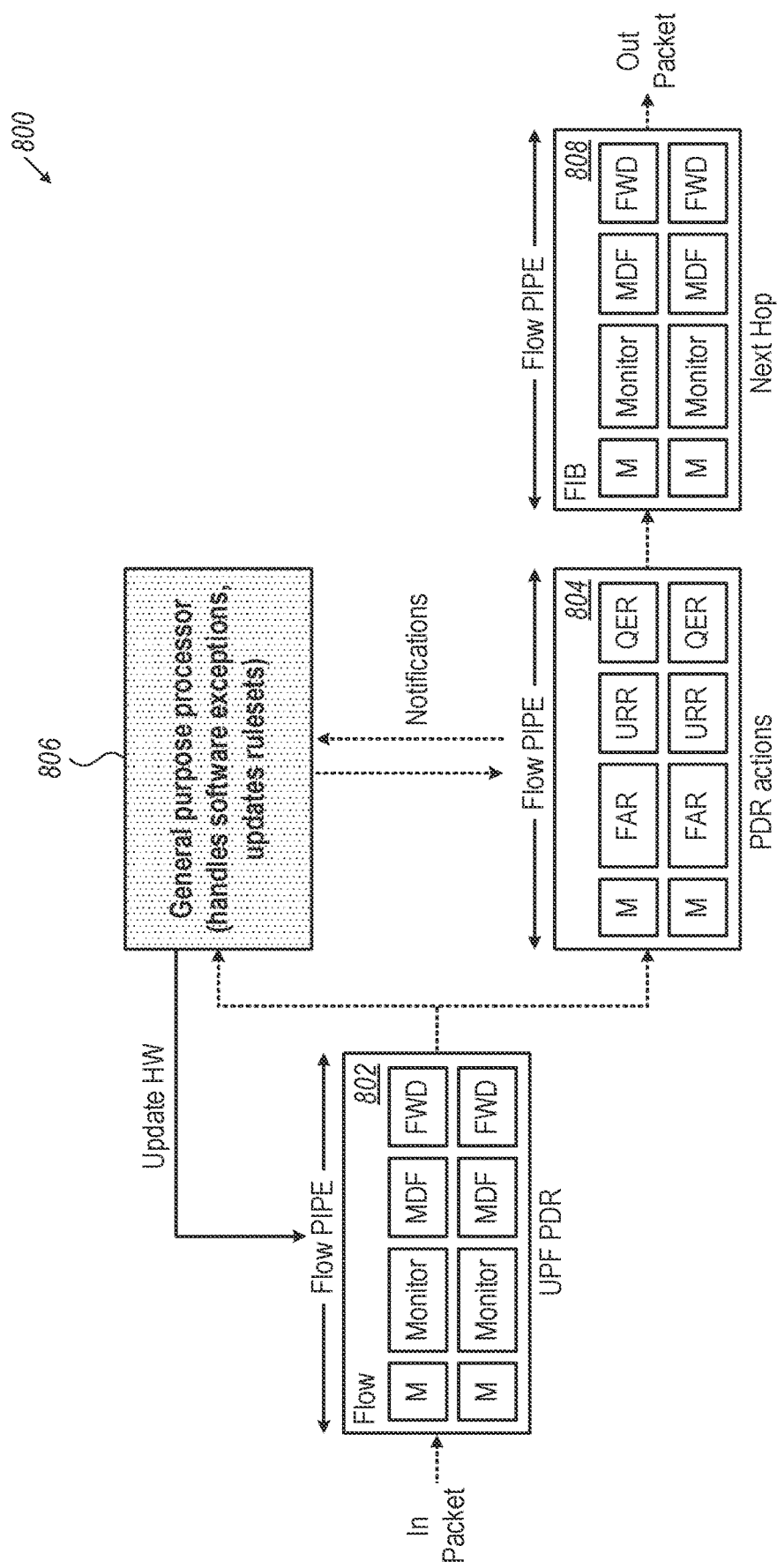
FIG. 8 is a block diagram that schematically illustrates the configuration of a DOCA-flow generated User-Plane-Function (UPF), in accordance with an embodiment of the present invention.

FIG. 8 is a block diagram that schematically illustrates the configuration of a DOCA-flow generated User-Plane-Function (UPF) 800, in accordance with an embodiment of the present invention. The UPF may be, for example, a fifth generation (5G) UPF.

UPF 800 comprises a Packet Detection Rules (PDR) flow pipe 802, which is configured to detect packet according to a predefined ruleset; and a PDR Actions flow pipe 804, which is configured to perform actions on the packet, according to a preset ruleset. When UPF PDR flow pipe 802 encounters a packet which is not covered by the PDR flow pipe's ruleset, the PDR flow pipe asserts and exception, which is input to a general-purpose processor 806; the general-purpose processor is configured to evaluate the required packet handling and the required packet actions. General purpose processor 806 is further configured to update the rulesets in both UPF PDR flow pipe 802 an in PDR actions flow pipe 804.

PDR Actions flow pipe 804 next forwards the modified packet to a next-hop flow pipe 808, which is configured to forward the packet to a destination, according to a preset FIB.

Figure 9:
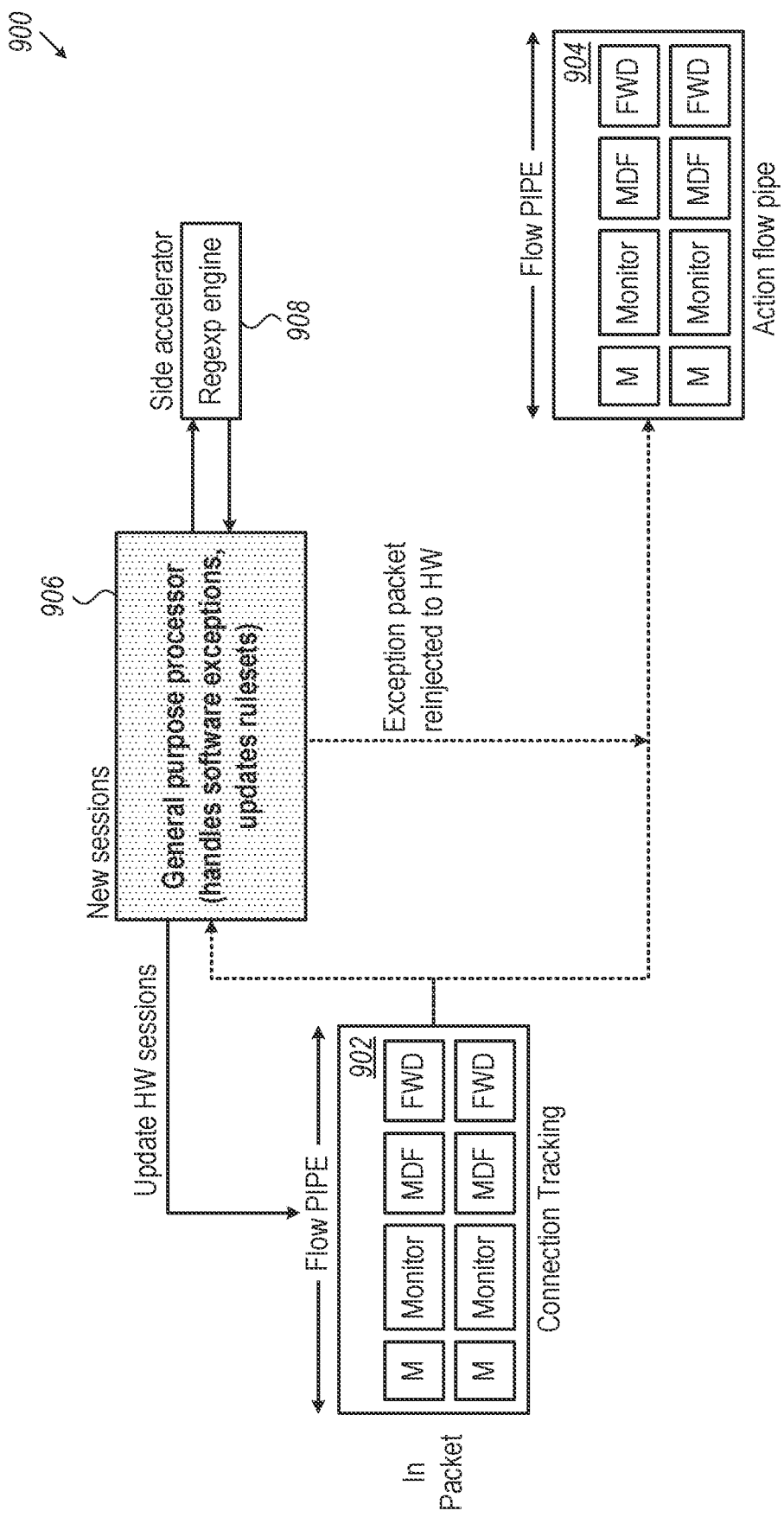
FIG. 9 is a block diagram that schematically illustrates the configuration of a DOCA-flow generated packet processing device comprising a combination of hardware and software, in accordance with an embodiment of the present invention.

FIG. 9 is a block diagram that schematically illustrates the configuration of a DOCA-flow generated packet processing device 900, comprising a combination of hardware and software, in accordance with an embodiment of the present invention. The processing apparatus comprises a connection tracking flow pipe 902, which is configured to receive packets and check the packet against a preset ruleset. If the packet (typically the packet header) is covered by the ruleset, the connection tracking flow pipe sends the packet to an action flow pipe 904, which is configured to perform actions on the packet according to the packet header.

If the packet is not covered by the ruleset, the connection tracking flow pipe signals an exception to a general-purpose processor 906, which will evaluate the packet using software. According to the example embodiment illustrated in FIG. 9, the general-purpose processor may use a side acceleration engine 908, for faster execution of special cases (for example, to evaluate regular expressions).

After evaluating the packet, the general-purpose processor injects the evaluated packet back to the hardware, and may in embodiments, update the ruleset of connection tracking flow pipe 902.

It should be mentioned that, while typically the pipes are a-priori defined, it is also possible to modify the pipes and/or to add new pipes and/or remove predefined pipes on the fly, using the API.

The configuration of system 100, including hardware agnostic library 112; the method of flowchart 200; the structure of flow pipes 300, 402, 404, 406, 408 and 410; the configuration of translation software 500, the configuration of parser hardware generation 600, the configuration of mixed hardware-software circuitry 700, the configuration of DOCA-flow generated UPF 800 and the configuration of the DOCA-flow generated packet processing device 900, are example configurations, methods and devices that are shown purely for the sake of conceptual clarity. Any other suitable configurations, methods and devices can be used in alternative embodiments.

In various embodiments, the target implementations generated by DOCA-flow may comprise suitable hardware, such as one or more Application-Specific Integrated Circuits (ASIC) or Field-Programmable Gate Arrays (FPGA), or a combination of ASIC and FPGA.

Processor 108 (FIG. 1), which is used for running DOCA flow software, as well as the target processors described hereinabove (with reference to FIGS. 7, 8 and 9) typically comprise one or more general-purpose processors, which are programmed in software to carry out the packet processing functions. The software may be downloaded to the processor in electronic form, over a network, for example, or it may alternatively or additionally, be provided and/or stored on non-transitory tangible media, such as magnetic, optical, or electronic memory.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
providing a library of hardware-agnostic packet-processing functions;
receiving, from a user, a functional hardware-agnostic specification of a packet-processing pipeline, the specification defined in terms of one or more of the packet-processing functions drawn from the library;
deriving, from the functional hardware-agnostic specification, a hardware-specific design of the packet-processing pipeline that is suited to manufacture a hardware device implementing the packet-processing pipeline, wherein deriving the hardware-specific design comprises (i) converting the functional hardware-agnostic specification into a hardware-agnostic intermediate representation, and (ii) generating the hardware-specific design from the intermediate representation; and
adding a new function or flow-pipe to the hardware-specific design, by:
converting a new functional hardware-agnostic specification, of the new function or flow-pipe, into the intermediate representation; and
generating an updated hardware-specific design, which includes the new function or flow-pipe, from (i) the intermediate representation of the functional hardware-agnostic specification of the packet-processing pipeline and (ii) the intermediate representation of the new function or flow-pipe.

2. The method according to claim 1, wherein providing the library comprises exposing to the user an Application Programming Interface (API) for defining the specification using the library.

3. The method according to claim 1, wherein the hardware-agnostic packet-processing functions perform one or more of:
Access Control List (ACL) functionality;
Longest Prefix Matching (LPM);
match table functionality;

encryption;
decryption;
packet modification;
packet mirroring;
packet metering;
packet counting;
connection tracking;
packet aging; and
packet forwarding.

4. The method according to claim 1, wherein at least one of the hardware-agnostic packet-processing functions comprises a user-configurable packet parsing operation, and wherein receiving the specification from the user comprises receiving a configuration of the packet parsing operation.

5. The method according to claim 1, wherein at least one of the hardware-agnostic packet-processing functions comprises a user-configurable action, and wherein receiving the specification from the user comprises receiving a configuration of the action.

6. The method according to claim 1, wherein deriving the hardware-specific design of the packet-processing pipeline comprises deriving a design of one of a switch, a router, a gateway, a network adapter, a firewall and a User-Plane Function (UPF).

7. An apparatus, comprising:
a memory, to store a library of hardware-agnostic packet-processing functions; and
a processor, to:
provide the library to a user;
receive, from the user, a functional hardware-agnostic specification of a packet-processing pipeline, the specification defined in terms of one or more of the packet-processing functions drawn from the library;
derive, from the functional hardware-agnostic specification, a hardware-specific design of the packet-processing pipeline that is suited to manufacture a hardware device implementing the packet-processing pipeline, wherein, to derive the hardware-specific design, the processor is to (i) convert the functional hardware-agnostic specification into a hardware-agnostic intermediate representation, and (ii) generate the hardware-specific design from the intermediate representation; and
add a new function or flow-pipe to the hardware-specific design, by:
converting a new functional hardware-agnostic specification, of the new function or flow-pipe, into the intermediate representation; and
generating an updated hardware-specific design, which includes the new function or flow-pipe, from (i) the intermediate representation of the functional hardware-agnostic specification of the packet-processing pipeline and (ii) the intermediate representation of the new function or flow-pipe.

8. The apparatus according to claim 7, wherein the processor is to expose to the user an Application Programming Interface (API) for defining the specification using the library.

9. The apparatus according to claim 7, wherein the hardware-agnostic packet-processing functions perform one or more of:
Access Control List (ACL) functionality;
Longest Prefix Matching (LPM);
match table functionality;
encryption;
decryption;
packet modification;
packet mirroring;
packet metering;
packet counting;
connection tracking;
packet aging; and
packet forwarding.

10. The apparatus according to claim 7, wherein at least one of the hardware-agnostic packet-processing functions comprises a user-configurable packet parsing operation, and wherein, in receiving the specification from the user, the processor is to receive a configuration of the packet parsing operation.

11. The apparatus according to claim 7, wherein at least one of the hardware-agnostic packet-processing functions comprises a user-configurable action, and wherein, in receiving the specification from the user, the processor is to receive a configuration of the action.

12. The apparatus according to claim 7, wherein the processor is to derive, from the specification, a hardware-specific design of one of a switch, a router, a gateway, a network adapter, a firewall and a User-Plane Function (UPF).

13. A computer software product, the product comprising a tangible non-transitory computer-readable medium in which program instructions are stored, which instructions, when read by a processor, cause the processor to:
store a library of hardware-agnostic packet-processing functions;
provide the library to a user;
receive, from the user, a functional hardware-agnostic specification of a packet-processing pipeline, the specification defined in terms of one or more of the packet-processing functions drawn from the library;
derive, from the functional hardware-agnostic specification, a hardware-specific design of the packet-processing pipeline that is suited to manufacture a hardware device implementing the packet-processing pipeline, wherein, to derive the hardware-specific design, the instructions cause the processor to (i) convert the functional hardware-agnostic specification into a hardware-agnostic intermediate representation, and (ii) generate the hardware-specific design from the intermediate representation; and
add a new function or flow-pipe to the hardware-specific design, by:
converting a new functional hardware-agnostic specification, of the new function or flow-pipe, into the intermediate representation; and
generating an updated hardware-specific design, which includes the new function or flow-pipe, from (i) the intermediate representation of the functional hardware-agnostic specification of the packet-processing pipeline and (ii) the intermediate representation of the new function or flow-pipe.

14. The product according to claim 13, wherein the instructions cause the processor to expose to the user an Application Programming Interface (API) for defining the specification using the library.

15. The product according to claim 13, wherein the hardware-agnostic packet-processing functions perform one or more of:
Access Control List (ACL) functionality;
Longest Prefix Matching (LPM);
match table functionality;
encryption;
decryption;

packet modification;
packet mirroring;
packet metering;
packet counting;
connection tracking;
packet aging; and
packet forwarding.

16. The product according to claim 13, wherein at least one of the hardware-agnostic packet-processing functions comprises a user-configurable packet parsing operation, and wherein the instructions cause the processor to receive from the user a configuration of the packet parsing operation.

17. The product according to claim 13, wherein at least one of the hardware-agnostic packet-processing functions comprises a user-configurable action, and wherein the instructions cause the processor to receive from the user a configuration of the action.

18. The product according to claim 13, wherein the instructions cause the processor to derive, from the specification, a hardware-specific design of one of a switch, a router, a gateway, a network adapter, a firewall and a User-Plane Function (UPF).

* * * * *